(No Model.)
W. R. ENGLAND.
FAUCET OR COCK.
No. 359,246. Patented Mar. 15, 1887.
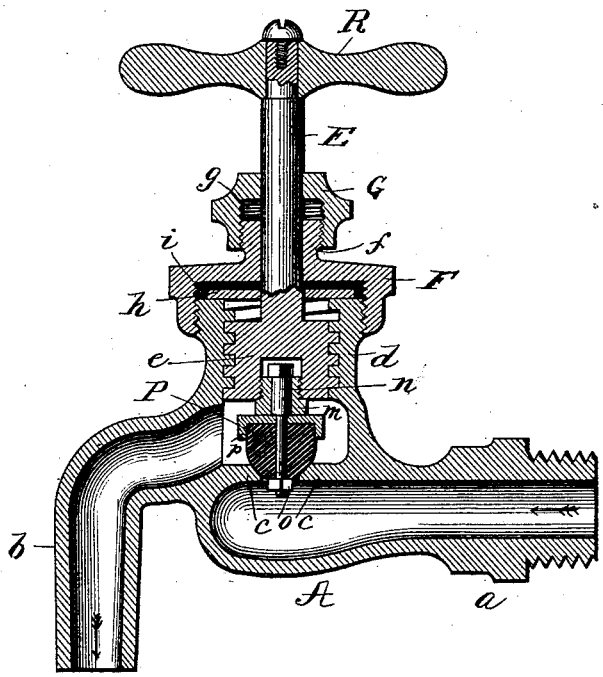
Witnesses.
W. Rossiter
Otto Lubkert
Inventor.
William R. England
By Wm. Le Lotz
Atty.

UNITED STATES PATENT OFFICE.

WILLIAM R. ENGLAND, OF CHICAGO, ILLINOIS.

FAUCET OR COCK.

SPECIFICATION forming part of Letters Patent No. 359,246, dated March 15, 1887.

Application filed September 24, 1886. Serial No. 214,477. (No model.)

*To all whom it may concern:*

Be it known that I, WILLIAM R. ENGLAND, a citizen of the United States of America, residing at Chicago, in the county of Cook and State of Illinois, have invented certain new and useful Improvements in Faucets or Cocks, of which the following is a specification, reference being had therein to the accompanying drawing.

This invention relates to that class of faucets generally known as "compression-cocks."

These faucets heretofore were generally provided with a rubber washer closing upon a flat seat for shutting off the water, which washers were exposed, however, to a rapid wear from the flow of the water; and, again, this rubber washer was secured to the end of a plug having a screw-threaded socket-coupling with the screw-threaded end of the operating-stem in a manner that, as closer the valve was brought to its seat where the resistance increases, and therefore more force is required, less screw-threads were engaged, and in consequence the contacting parts were soon worn; and to overcome these objections has been the object of this my invention.

It has been my object to construct a valve that in its detail arrangement of parts will overcome the difficulties heretofore experienced, and that will insure durability to its wearing-surfaces.

My invention therefore consists of the novel devices and combinations of devices hereinafter described, and specifically claimed.

The accompanying drawing represents a section through the center line of the faucet, in which—

A denotes the casing having water-inlet nozzle $a$ and water-escape nozzle $b$, both divided by the conically-bored valve-seat $c$, and of the valve-chamber $d$, having cut in its internal face a square-threaded female screw that engages the enlarged screw-threaded end of stem E. The cap F has a neck, $f$, bored out for the cylindrical stem E to pass through it, and is screw-threaded for the cup-shaped nut G, that will compress the packing $g$, placed between neck $f$ and nut G, and thus will form a close joint around such stem. To its bottom the cap F has an annular internally screw-threaded flange engaging with the upper screw-threaded end of chamber $d$. A metal washer, $h$, and a rubber washer, $i$, being interposed between nozzle $d$ and cap F, are compressed therein to insure a tight joint.

The screw-threaded end $e$ of stem E is tapped, for securing a screw-sleeve, $m$, bored out for receiving the under-head larger-diameter end of a small bolt, $n$, upon the lower end of which is secured, by a screw-nut, $o$, the conical vulcanized rubber valve P, inserted with its upper or square end into a metal or cup-shaped cap, $p$. The valve P and cap $p$ being rigidly secured upon the bolt $n$ between its shoulder and nut, its under-head portion is fitted to turn loose in screw-sleeve $m$.

Upon the upper extremity of stem E is secured the T-handle R in the usual manner.

Valve P being vertically in line with seat $c$, the turning of the screw-stem in one direction will move the valve against the water-pressure upon such seat, and the valve being pivotally coupled with the screw-stem, it will be rotated sufficiently with each operation to expose all its sides evenly to the action of the flowing water, thereby insuring a uniform wear.

I am aware that faucets have been made with a swiveling valve by having an annular groove in a neck to which the valve is attached, and a stud or stop projecting into said groove; and I do not claim such, as it is apparent that this construction does not possess the strength nor simplicity of the construction shown and claimed by me.

What I claim is—

The herein-described faucet or cock, consisting of the case A, having the valve-seat $c$ and internally-threaded chamber $d$, the cap F, screwed upon chamber $d$, the metal washer $h$ and elastic washer $i$, interposed between parts F and $d$, the stem E, having enlarged threaded lower end provided with a threaded opening in the bottom thereof, the nut $m$, threaded into said opening, the bolt $n$, enlarged at its upper end and passing through nut $m$, and having a smaller lower end, elastic valve P, secured upon said smaller lower end, and the interposed cap $p$, resting against shoulder on bolt $n$, all constructed and combined as herein set forth.

In testimony whereof I affix my signature in presence of two witnesses.

WILLIAM R. ENGLAND.

Witnesses:
WM. H. LOTZ,
OTTO LUBKERT.